United States Patent
Vanhooser

(10) Patent No.: US 11,429,572 B2
(45) Date of Patent: Aug. 30, 2022

(54) RULES-BASED DATASET CLEANING

(71) Applicant: Palantir Technologies, Inc., Palo Alto, CA (US)

(72) Inventor: Shelby Vanhooser, Washington, DC (US)

(73) Assignee: Palantir Technologies, Inc., Palo Alto, CA (US)

( * ) Notice: Subject to any disclaimer, the term of this patent is extended or adjusted under 35 U.S.C. 154(b) by 68 days.

(21) Appl. No.: 16/449,207

(22) Filed: Jun. 21, 2019

(65) Prior Publication Data
US 2020/0394166 A1  Dec. 17, 2020

Related U.S. Application Data

(60) Provisional application No. 62/861,140, filed on Jun. 13, 2019.

(51) Int. Cl.
*G06F 16/21* (2019.01)
*G06F 16/215* (2019.01)
*G06F 16/22* (2019.01)

(52) U.S. Cl.
CPC .......... *G06F 16/215* (2019.01); *G06F 16/221* (2019.01)

(58) Field of Classification Search
CPC ..... G06F 16/328; G06F 16/215; G06F 16/221
USPC ....................................................... 707/692
See application file for complete search history.

(56) References Cited

U.S. PATENT DOCUMENTS

| | | | |
|---|---|---|---|
| 10,650,020 B1* | 5/2020 | Mehta | G06F 16/258 |
| 2005/0278270 A1 | 12/2005 | Carr et al. | |
| 2011/0029546 A1* | 2/2011 | Mineno | G06F 16/258 707/756 |

(Continued)

OTHER PUBLICATIONS

Extended European Search Report for European Application No. 20179567.1, dated Sep. 16, 2020, 9 pages.

*Primary Examiner* — Syling Yen
(74) *Attorney, Agent, or Firm* — Lowenstein Sandler LLP

(57) ABSTRACT

One or more processors store rules for performing rules-based cleaning operations on a plurality of datasets, wherein each rule comprises one or more functions to be executed against a dataset during the rules-based cleaning operations, the one or more functions each having one or more associated conditions and actions, wherein the one or more actions are performed on the dataset responsive to the one or more associated conditions being satisfied. The one or more processors further apply the rules to each of the plurality of datasets to perform the rules-based cleaning operations. To apply the rules to a given dataset, the one or more processors identify an ordered list of the one or more functions to be executed with respect to the given dataset during the rules-based cleaning operations and determine, for each of the one or more functions, whether the given dataset satisfies one or more conditions associated with a respective function of the one or more functions. Responsive to the given dataset satisfying the one or more conditions associated with the respective function, the one or more processors perform, on the given dataset, one or more actions associated with the respective function and provide a derived dataset comprising at least one modification to the given dataset resulting from the one or more actions associated with the respective function.

20 Claims, 6 Drawing Sheets

(56) References Cited

U.S. PATENT DOCUMENTS

2014/0074591 A1* 3/2014 Allen ................. G06Q 30/0244
    705/14.43
2018/0075115 A1* 3/2018 Murray ............... G06F 16/2456

* cited by examiner

RULES-BASED DATASET CLEANING

RELATED APPLICATIONS

This application claims the benefit of U.S. Provisional Patent Application No. 62/861,140, filed Jun. 13, 2019, the entire contents of which are hereby incorporated by reference herein.

TECHNICAL FIELD

This disclosure relates to the field of data aggregation and analysis systems, and in particular to rules-based dataset cleaning.

BACKGROUND

Modern data centers often comprise thousands of hosts that operate collectively to service requests from even larger numbers of remote clients. During operation, components of these data centers can produce significant volumes of machine-generated data. In addition, given the increasing amount of data produced and collected by businesses and other organizations, processing data of all sorts through data pipeline systems can only be expected to increase. This trend is coupled with a need for a more automated way to maintain such systems and for the ability to trace and track data, including old versions of the data, and updated versions of the data, as it is processed.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

DETAILED DESCRIPTION

Figure 1:
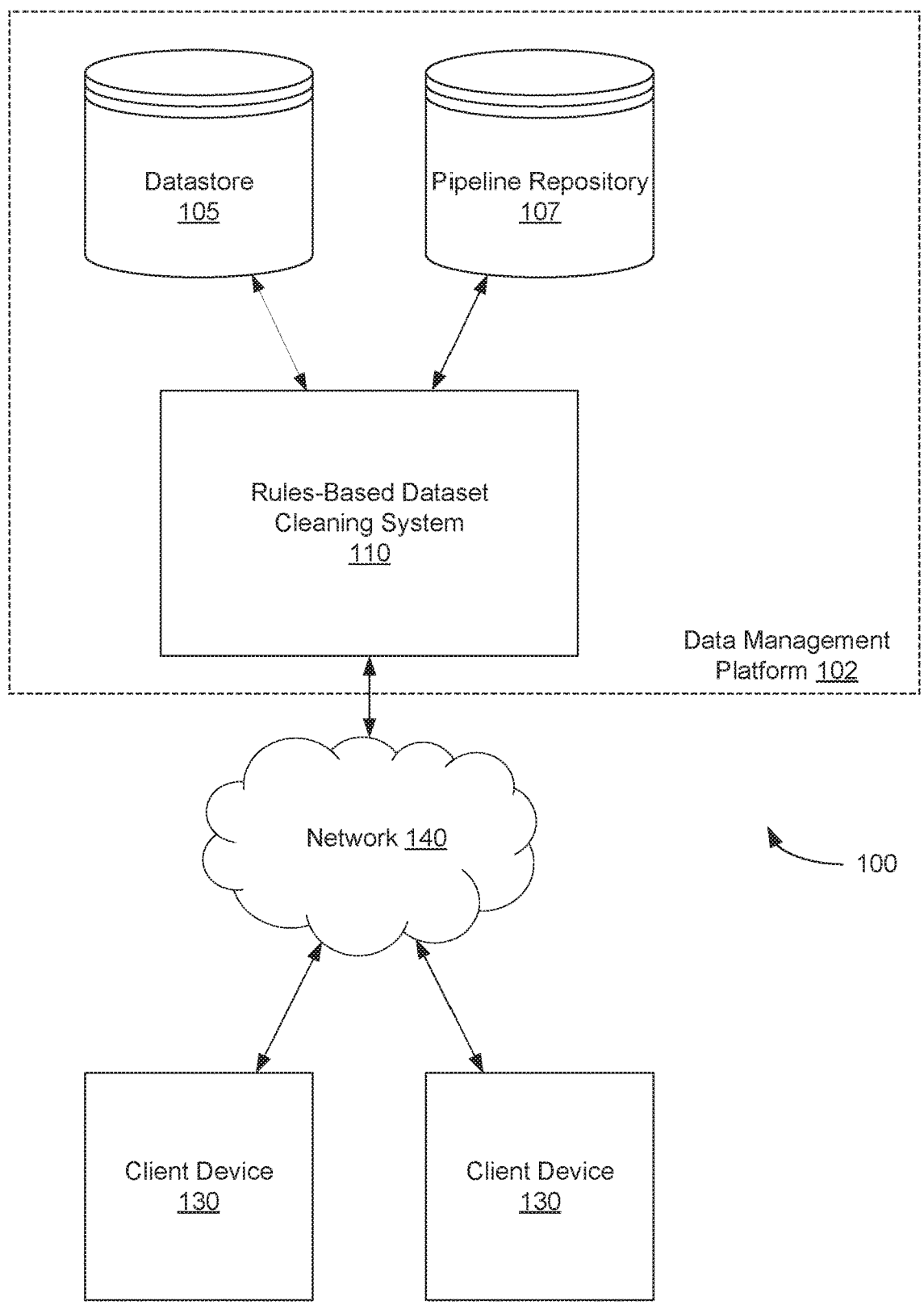
FIG. 1 is a block diagram illustrating a network environment in which a rules-based dataset cleaning system may operate, according to an implementation.

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to rules-based dataset cleaning. Any organization having a large number of datasets (i.e., collections of data) created and managed by different users is likely to have inconsistencies across the datasets. For example, columns of the same or similar data in different datasets may have different column names, different column data types, etc. These inconsistencies can make tasks such as correlating data across datasets, performing data transformations (i.e., applying logic to initial data sets to produce one or more derived datasets), etc. challenging since any data analysis system will not be able to recognize the relationship between these columns in different datasets. Conventional solutions require a labor intensive manual mapping of incorrect column names to new desired column names. This one-to-one substitution is time consuming even for small numbers of datasets and completely unsustainable as the number of datasets increases (e.g., to 10 k+datasets). Additionally, although any one individual might be aware of the correlation of one column name to another, this knowledge is not shareable across the organization in any consistent fashion.

Aspects of the present disclosure address the above and other deficiencies by providing a tool that allows for performance of rules-based dataset cleaning operations to provide unification of semantics across datasets. The rules-based dataset cleaning operations can be used, for example, to modify a selected dataset to synchronize column metadata (e.g., column name, column data type, or other information besides the actual data itself) in a consistent and reproducible fashion. Once generated and stored, the rules that define the rules-based dataset cleaning operation can be applied to additional datasets to clean those datasets according to the rules automatically. As part of the rules for the rules-based dataset cleaning operation, a user can define a number of actions to be performed during the cleaning operation, including for example, changes to the dataset to unify naming schemes of datasets and columns (including consistent capitalization and wording), to correct data types for columns across multiple datasets, or to correct special cases for any combination of the name and content for datasets and columns. In one implementation, the actions are performed if a corresponding function determines that execution of an action is appropriate. The functions can make such a determination by evaluating one or more conditions pertaining to a context (e.g., dataset path, current column name/data type) of the dataset to return a result indicating whether or not to perform the action. In order to make the cleaning operation consistent and repeatable, the tool can define an ordered list of a number of functions to be executed during a cleaning operation to invoke respective actions. Since some actions invoked by a subsequent function can operate on the result of an action invoked by a previous function, the ordered list can maintain the order in which the functions and the respective actions are performed so that the end result is consistent for multiple runs of the cleaning operation. Once all of the functions defined in the ordered list and their respective actions have been performed, a new derived dataset can be formed which includes a "clean" version of the original dataset having any number of changes made to the dataset metadata and/or the column metadata. In some implementations, any data processing pipeline used by a data management system of an organization can utilize the new derived dataset in any transformations that would previously have used the original dataset. A data pipeline may refer to an ordered set of logic (e.g., a collection of computer software scripts or programs) that performs a multi-step transformation of data obtained from data sources to produce one or more output datasets. Additional details of rules-based dataset cleaning are provided below with respect to FIGS. 1-6.

Accordingly, the technology described herein allows users to perform cleaning operations on a large number of datasets without the time consuming and manual effort required to clean each dataset individually. The rules-based dataset cleaning operations may be useful in implementations were the number of datasets to be cleaned is high and the required cleaning tasks are repeatable. In addition, any individual knowledge held by one or more persons in an organization pertaining to the relationships or correlations between datasets or column names within those datasets can be easily shared and made available to all users. Furthermore, by defining rules-based cleaning operations, the dataset cleaning can be performed over and over again on the same or different datasets automatically without having to redefine the specific actions to be performed in order to synchronize column metadata with expected or preferred values in use throughout the organization.

FIG. 1 is a block diagram illustrating a network environment in which a rules-based dataset cleaning system may operate, according to an implementation. The network environment 100 can include one or more client devices 130 and a data management platform 102, which can be in data communication with each other via network 140. Computer system 600 illustrated in FIG. 6 may be one example of any of client devices 130 or a server(s) in the data management platform 102. The network 140 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 130 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability.

Data management platform 102 may include, for example, a server computer or any other system providing computing capability. Alternatively, data management platform 102 may employ a plurality of computing devices that may be arranged, for example, in one or more server banks or computer banks or other arrangements. Such computing devices may be positioned in a single location or may be distributed among many different geographical locations. For example, data management platform 102 may include a plurality of computing devices that together may comprise a hosted computing resource, a grid computing resource and/or any other distributed computing arrangement. In some cases, data management platform 102 may correspond to an elastic computing resource where the allotted capacity of processing, network, storage, or other computing-related resources may vary over time.

In some implementations, data management platform 102 can include rules-based dataset cleaning system 110, datastore 105 storing the underlying data (e.g., enterprise data), and pipeline repository 107 storing one or more data pipelines. A pipeline includes a set of logic to execute a series of data transformation steps on one or more initial datasets stored in datastore 105. Each data transformation step produces one or more derived datasets that may also be stored in datastore 105. Depending on the implementation, datastore 105 and pipeline repository 107 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The pipeline repository 107 may be part of the datastore 105 or may be a separate repository including, for example, a database, one or more tables, one or more files, etc.

Datastore 105 may include structured and/or unstructured sets of data that can be divided/extracted for provisioning when needed by one or more components of the workbook management system 100. Datastore 105 may include one or more versioned datasets of information. The dataset(s) may be stored in one or more databases, such as a relational database. A relational database may organize information/data into tables, columns, rows, and/or other organizational groupings. Groupings of information may be linked/referenced via use of keys (e.g., primary and foreign keys).

In one implementation, the datasets in datastore 105 are both "immutable" and "versioned" datasets. A dataset may be defined as a named collection of data. The datasets are "immutable" in the sense that it is not possible to overwrite existing dataset data in order to modify the dataset. The datasets are "versioned" in the sense that modifications to a dataset, including historical modifications, are separately identifiable.

Because datasets are immutable and versioned, it is possible to determine the data in a dataset at a point in time in the past, even if that data is no longer in the current version of the dataset. More generally, the ability to trace dataset data to the data source data from which the dataset data was derived or obtained, even if the dataset data is no longer in the current version of the dataset and even if the data source data is no longer available from the data source, is maintained.

An initial dataset may be raw (i.e., un-edited) data that comes directly from a data source (e.g., a full list of customer accounts) and represents the starting point of a data pipeline. Alternatively, an initial dataset may be a derived dataset, which is a dataset that is generated (i.e., built) by editing (e.g., manually or by executing logic of a data transformation step from pipeline repository 107) one or more initial datasets. A derived dataset may be potentially further transformed to provide one or more other datasets as input to the next data transformation step. Each data transformation step may perform one or more operations on the input dataset(s) to produce one or more derived datasets. For example, a data transformation step may produce a derived dataset by filtering records in an input dataset to those comprising a particular value or set of values, or by joining together two related input datasets, or by replacing references in an input dataset to values in another input dataset with actual data referenced. Because derived datasets, like datasets generally, are immutable and versioned in the system, it is possible to trace dataset data to the data source data from which the dataset data was derived or obtained, even if the dataset data is no longer in the current version of the derived dataset and even if the data source data is no longer available from the data source.

In one implementation, data transformation logic stored in pipeline repository 107 is also versioned. Doing so, not only provides the ability to trace dataset data to the data source data the dataset data is based on, but also, if the dataset is a derived dataset, to the version of the data transformation logic used to build the derived dataset. This can be useful for tracking down errors in dataset data caused by errors or "bugs" (i.e., programming errors) in the version of the data transformation logic that was executed to build the dataset.

Rules-based dataset cleaning system 110 can assist users in "cleaning" datasets from datastore 105. Rules-based dataset cleaning system 110 can receive user input data to define one or more rules-based dataset cleaning operations to provide unification of semantics across any number of selected datasets from datastore 105 (e.g., prior to the use of those datasets in a data processing pipeline). The user input data can include a number of rules that specify how a selected dataset is to be modified during a rules-based dataset cleaning operation in order to synchronize column metadata with that of at least one other dataset in a consistent and reproducible fashion. For example, the rules can specify that a certain column name in a dataset can be changed to a different column name or that a certain column data type can be changed to a different data type to match an expected column name or column data type for that column. Upon receipt of such user input, rules-based dataset cleaning system 110 can create a corresponding rules-based cleaning operation including a number of actions that are performed to affect at least one modification according to the rules, a number of functions that specify when to perform the number of actions, and an ordered list of functions that specifies a certain order in which the functions and the associated actions are to be performed. In response to a triggering event, rules-based dataset cleaning system 110 may apply the defined rules to an input dataset (e.g., from datastore 105) to perform the rules-based dataset cleaning operation. As a result of the rules-based dataset cleaning operation, a derived dataset is formed including at least one modification to the input dataset. Rules-based dataset cleaning system 110 may store the derived dataset in datastore 105 and update pipeline repository 107 such that any transformations or other operations that originally pointed to the input dataset will instead be performed on the derived dataset in datastore 105.

Figure 2:
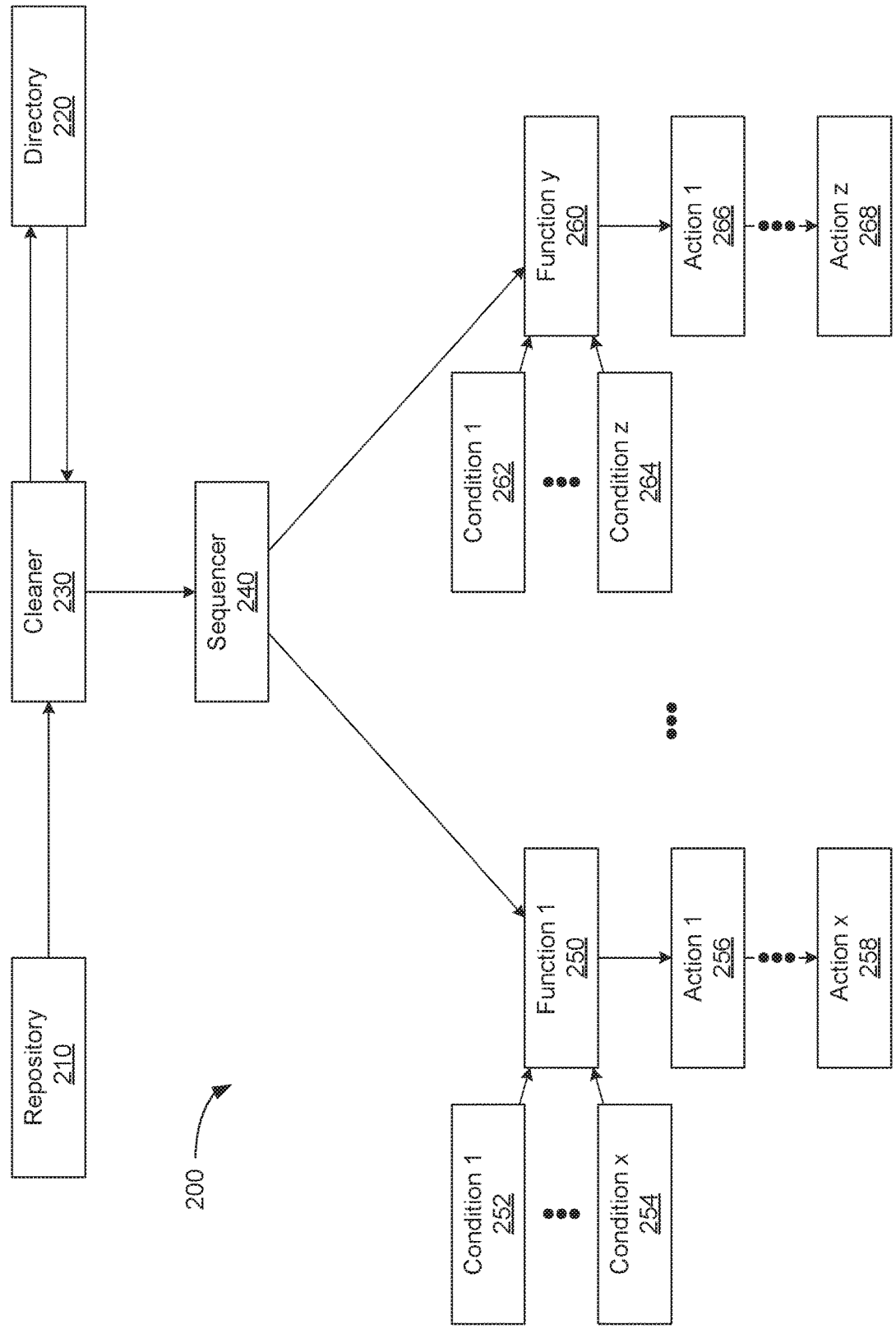
FIG. 2 is a block diagram illustrating an object model for a rules-based dataset cleaning operation performed by a rules-based dataset cleaning system, according to an implementation.

FIG. 2 is a block diagram illustrating an object model for a rules-based dataset cleaning operation performed by rules-based dataset cleaning system 110, according to an implementation. In one embodiment, the rules-based dataset cleaning operation is based on rules that are derived from the object model 200. The object model 200 may include one or more objects that each represent an action to be performed with respect to one or more datasets, one or more objects that each represent a function that invokes a set of actions, and one or more objects that each represent a condition defining whether to perform an action from the respective set of actions. In some implementations, the object model also includes one or more objects that each represent a sequencer defining the order in which the functions are executed. The object model may also include an object representing a cleaner that orchestrates the entire rules-based dataset cleaning operation. The object model may have different levels, with the cleaner being the highest-level object, the sequencer(s) being dependent on the cleaner, the functions being dependent on the sequencer(s) and the conditions and actions being dependent on the functions.

In one embodiment, the object model may further include one or more objects representing a helper intended to aid the user in rapidly building rules-based dataset cleaning operations by exploiting the context of writing cleaning rules to make the process automatic. The helper can build actions, conditions, and functions based on assumptions of certain standard practices. By recognizing the circumstances in which objects of the object model are being created, the helper can eliminate redundancy in creating those objects. The different levels of the hierarchy of objects allow certain objects to inherit characteristics of other objects from which they depend. For example, if a rules-based dataset cleaning operation is defined to replace all occurrences of a certain word (e.g., "acceptance") with another word (e.g., "accp"), helper can create the actions, conditions, and functions to do so, and apply them to all datasets targeted by a given instance of the cleaner. Thus, the helper can take a condensed representation of objects and de-serialize them into a working object model.

Referring to FIG. 2, an example visualization of the object model 200 is provided. As discussed above, the object model includes a hierarchy of objects with cleaner 230 being the highest level object. Cleaner 230 can access repository 210 and directory 220. In one embodiment, repository 210 includes a number of original or "unclean" datasets. For example, repository 210 may be representative of datastore 105 (or at least a portion of datastore 105), as described above with respect to FIG. 1. In one embodiment, at least a portion of the original datasets in repository 210 includes rows and columns. For example, each row in a given dataset may represent a separate entry in the dataset and include a data element for each column of the dataset. Each column has an associated column name or column identifier and an associated column data type. As the number of datasets in repository 210 increases, so does the likelihood of inconsistencies across the datasets. Different datasets in repository 210 may have columns of the same or similar data category, but those columns may be named differently. For example, a column of peoples' names may be labeled as "user_name" in one dataset and as "employee name" in another dataset, although the data elements in each column may be of the same category. These inconsistences can introduce challenges when performing tasks such as correlating data across datasets or performing data transformations.

In one embodiment, a user can indicate datasets from repository 210 on which a given rules-based dataset cleaning operation should be performed. For example, a user can provide a criterion (e.g., a path, a date of creation, etc.) for selecting a dataset(s) from repository 210 for cleaning or a user can specify a particular dataset(s) (e.g., by filename or identifier) that should be "cleaned." The selected and/or specified datasets from repository 210 can be identified in directory 220. In one embodiment, cleaner 230 can perform the rules-based dataset cleaning operations on the datasets identified in directory 220. For example, cleaner 230 can perform the rules-based dataset cleaning operations automatically in response to the occurrence of a triggering event. Depending on the embodiment, the triggering event can include a periodic interval having elapsed since a previous rules-based cleaning operation was performed, the addition of a new dataset to the plurality of datasets, receipt of a request to perform a rules-based cleaning operation, etc. For example, cleaner 230 can be configured to perform the rules-based dataset cleaning operations on a dataset periodically (e.g., once a day, once a week, or once a month). In one embodiment, cleaner 230 monitors a period of time since a previous rules-based dataset cleaning operation was performed on a given dataset and triggers performance of a new rules-based cleaning operation on the dataset in response to a given interval having elapsed. In one embodiment, each time a new dataset is added to directory 220, cleaner 230 performs a rules-based dataset cleaning operation on that dataset automatically. In another embodiment, any time a new dataset is created, imported, or otherwise added to repository 210 (or datastore 105), such a dataset is automatically added to directory 220 and a rules-based dataset cleaning operation is performed. In one embodiment, cleaner 230 can receive user input requesting that a rules-based dataset cleaning operation be performed on a dataset identified in directory 220 or elsewhere.

Once a rules-based dataset cleaning operation is triggered, cleaner 230 can begin evaluating a number of functions in an ordered list specified by sequencer 240. In order to make the rules-based dataset cleaning operations consistent and repeatable, the ordered list of sequencer 240 indicates a number of functions (e.g., Function 1 250, Function Y 260) to be executed during a cleaning operation and a specific order in which those functions can be executed. Since actions invoked by some subsequent functions can operate on the result of actions invoked by a previous function, the ordered list of sequencer 240 maintains the order in which the functions and the respective actions are executed so that the end result is consistent for multiple runs of the rules-based dataset cleaning operation. For example, the first function can be associated with a set of actions intended to correct inconsistencies in the names of the datasets, the second function can be associated with a set of actions intended to remove spaces and/or special characters from the names of the columns, the third function can be associated with a set of actions intended to unify names of particular columns or columns of particular datasets, the fourth function can be associated with a set of actions intended to unify data types of particular columns or columns of particular datasets, etc.

In another embodiment, the possible actions associated with a function can further include column content actions that append content after a columns values, casts a column to a different column data type, multiplies a column's values by a constant, prepends a value to a columns content's, or regex replaces values in a column with other values. In addition, dataset content actions can mark a dataset as incremental with options, repartition an output dataset based on a set of columns into a specified number of partitions, or specify options to decorate an output data frame with when writing. Also, column name actions can perform the act of dropping the column currently being cleaned, inserting text in the middle of occurrences of a certain pattern in a column name, replace occurrences of a pattern with a lowercase equivalent, or replaces occurrences of a pattern with a replacement string in a column name. Furthermore, dataset name actions can insert a string in the middle of occurrences of a pattern in a dataset name, or replace occurrence of a pattern with a replacement string in a dataset name.

Accordingly, cleaner 230 can identify a first function (e.g., Function 1 250) from the ordered list of sequencer 240 for execution. Each function can include logic executed to determine whether an associated action should be performed on a dataset as part of the rules-based dataset cleaning operation. When executed, the function can evaluate one or more conditions (e.g., Condition 1 252, Condition x 254) pertaining to a context of the dataset to return a result indicating whether or not to perform one or more actions (e.g., Action 1 256, Action x 258). In one embodiment, cleaner 230 evaluates the one or more conditions and returns one or more Boolean values indicating whether or not an action corresponding to the condition should be performed. For example, the retuned value may be true or false, 1 or 0, etc. The context of the dataset can refer, for example, to at least one of a name, identifier, path, or storage location associated with the given dataset. In one embodiment, when executing Function 1 250, cleaner 230 determines whether a name of the dataset being cleaned (i.e., an input dataset) matches a parameter (e.g., a regular expression or "regex," a value, etc.) defined by Condition 1 252. If the name does match the defined parameter (i.e., if Condition 1 252 is satisfied), then cleaner 230 may perform Action 1 256 (e.g., change any column in the input dataset named "employee name" to "user_name"). Cleaner 230 may then determine whether a path of the input dataset matches a parameter defined by Condition x 254. If the path does match the defined parameter (i.e., if Condition x 254 is satisfied), then cleaner 230 may perform Action x 258 (e.g., change a column in the input dataset having the column data type of long to a timestamp). In one embodiment, there may be any number of conditions and corresponding actions associated with a given function. Depending on the embodiment, each condition may correspond to one action, each condition may correspond to more than one action, or more than one condition may correspond to a certain action. Thus, the number of conditions associated with a given function may or may not be the same as the number of actions associated with the function.

After evaluating all of the conditions (i.e., Condition 1 252-Condition x 254) associated with Function 1 250 and performing all of the appropriate actions (i.e., Action 1 256-Action x 258) specified by the evaluation of the conditions, cleaner 230 may consult the ordered list of sequencer 240 to identify a next function (e.g., Function y 260) for execution. When executed, Function y 260 can evaluate one or more conditions (e.g., Condition 1 262, Condition z 264) pertaining to a context of the dataset to return a result indicating whether or not to perform one or more actions (e.g., Action 1 266, Action z 268). Depending on the embodiment, Condition 1 262 and Condition z 264 associated with Function y 260 may be either the same as or different than Condition 1 252 and Condition x 254 associated with Function 1 250. As above, there may be any number of functions defined for a given rules-based dataset cleaning operation, each function having any number of conditions and corresponding actions.

Once all of the functions defined in the ordered list of sequencer 240 have been executed and the appropriate corresponding actions have been performed, the result is a new derived dataset which includes a "clean" version of the input dataset having any number of changes made to the dataset metadata and/or the column metadata. Cleaner 230 can store the clean derived dataset in repository 210 to make it available to any data processing pipeline, such as from pipeline repository 107, that would previously have operated on the original dataset. The object model 200 for the entire rules-based dataset cleaning operation also remains available (e.g., in datastore 105) to be performed on other datasets in repository 210 and directory 220. Thus, the rules-based dataset cleaning operation can be performed on other datasets in parallel or at a future time.

Figure 3:
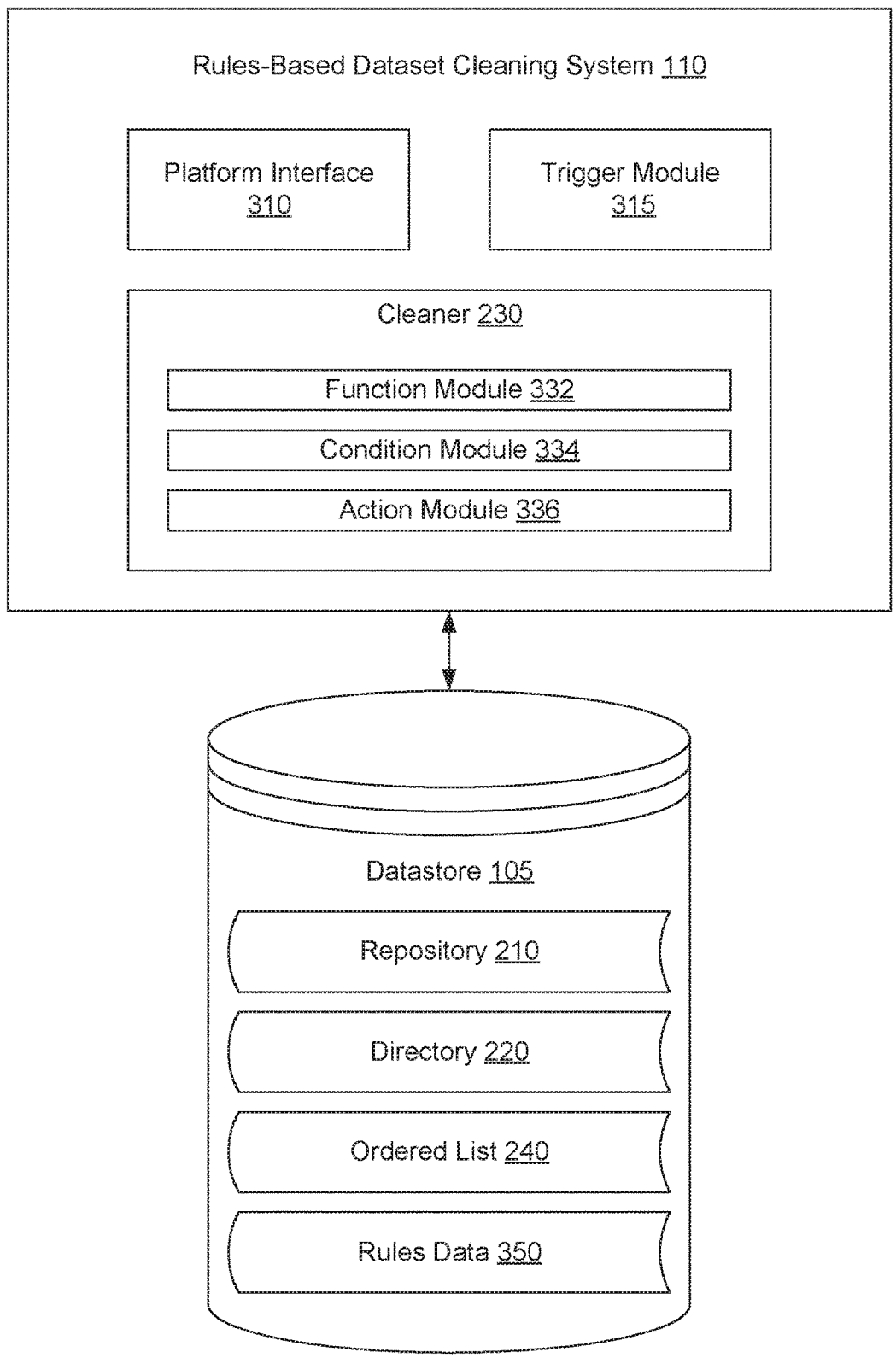
FIG. 3 is a block diagram illustrating a rules-based dataset cleaning system, according to an implementation.

FIG. 3 is a block diagram illustrating rules-based dataset cleaning system 110, according to an implementation. Rules-based dataset cleaning system 110 may include platform interface 310, trigger module 315, and cleaner 230. This arrangement of modules and components may be a logical separation, and in other implementations, these modules or other components can be combined together or separated in further components, according to a particular implementation.

In one implementation, datastore 105 is connected to rules-based dataset cleaning system 110 and includes repository 105, directory 220, sequencer 240, and rules data 350. Rules data 350 can include data specifying the rules for performing rules-based dataset cleaning operations on a plurality of datasets (e.g., from repository 210 or directory 220). Each rule in rules data 350 can include one or more functions to be executed against a dataset during the rules-based cleaning operations. Each of the one or more functions can have one or more associated conditions and actions, wherein the one or more actions are performed on the dataset responsive to the one or more associated conditions being satisfied. In one implementation, a single computer system (e.g., data management platform 102) may include both rules-based dataset cleaning system 110 and datastore 105. In another implementation, datastore 105 may be external to the computer system and may be connected to rules-based dataset cleaning system 110 over a network or other connection. In other implementations, rules-based dataset cleaning system 110 may include different and/or additional components which are not shown here to simplify the description. Datastore 105 may include a file system, database or other data management layer resident on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, platform interface 310 manages interactions between rules-based dataset cleaning system 110 and other components of data management platform 102 and/or network environment 100, including client devices 130. For example, platform interface 310 may generate a user interface for presentation on any of client devices 130, and process user interaction with rules-based dataset cleaning system 110. This user interaction, may include, for example, receiving user definition of the rules data 350 for performing rules-based dataset cleaning operations, including actions to be performed to modify a dataset, conditions associated with functions to be evaluated to determine whether to perform a certain action, and an ordered list of sequencer 240 specifying an order in which the functions are to be executed. The user interaction can further include rules data 350 specifying triggering events to be monitored by trigger module 315, which would initiate performance of a rules-based dataset cleaning operation. In addition, the user interaction can include an indication of one or more datasets from repository 210 to be added to directory 220 on which rules-based dataset cleaning operations are to be performed. In one embodiment, platform interface 310 stores the rules data 350 in datastore 105 and provides one or more derived datasets resulting from a rules-based dataset cleaning operation to repository 210 or to pipeline repository 107.

In one implementation, trigger module 315 monitors operations of rules-based dataset cleaning system 110 and of data management platform 102 to determine when to initiate a rules-based dataset cleaning operation using rules data 350. In one embodiment, cleaner 230 will apply the rules to each of a plurality of datasets responsive to the occurrence of a triggering event detected by trigger module. The triggering event can include, for example, a periodic interval having elapsed since a previous rules-based cleaning operation was performed. For example, trigger module 315 can monitor a period of time since a previous rules-based dataset cleaning operation was performed on a given dataset and determine if a threshold amount of time has elapsed (e.g., one day, one week, one month). If this periodic interval has elapsed, trigger module 315 can notify cleaner 230 to perform the rules-based dataset cleaning operations on the given dataset. In addition, the trigger event can include, for example, an addition of a new dataset to the plurality of datasets in repository 210 or directory 220. In one embodiment, each time a new dataset is added to directory 220, trigger module 315 notifies cleaner 230 to perform a rules-based dataset cleaning operation on that dataset automatically. In another embodiment, any time a new dataset is created, imported, or otherwise added to repository 210 such a dataset is automatically added to directory 220 and a rules-based dataset cleaning operation is performed. The trigger event can also include, for example, receipt of a request to perform a rules-based cleaning operation. In one embodiment, trigger module 315 can detect that platform interface 310 receives such a request (e.g., from a user or another application running on data management platform 102) and can notify cleaner 230 to perform a rules-based dataset cleaning operation on the specified dataset in directory 220 or elsewhere.

In one implementation, cleaner 230 applying the rules from rules data 350 to datasets in directory 220 to perform the rules-based cleaning operations. Cleaner 230 may include, for example, function module 332, condition module 334 and action module 336. Function module 332 can identify a number of functions in an order specified by the ordered list of sequencer 240. Function module 332 can further identify a first function (e.g., Function 1 250) from the ordered list of sequencer 240 for execution. Each function can include logic executed to determine whether an associated action should be performed on a given dataset as part of the rules-based dataset cleaning operation. When a function is identified and executed by function module 332, condition module 334 can evaluate one or more conditions (e.g., Condition 1 252, Condition x 254) pertaining to a context of the dataset to return a result indicating whether or not to perform one or more actions (e.g., Action 1 256, Action x 258). In one embodiment, condition module 334 evaluates the one or more conditions and returns one or more Boolean values indicating whether or not an action corresponding to the condition should be performed. The context of the dataset can refer, for example, to at least one of a name, identifier, path, or storage location associated with the given dataset. If condition module 334 determines that a relevant condition is satisfied, action module 336 can perform one or more associated actions on the given dataset. The actions may include making at least one modification to the given dataset, such as a modification to a column name or column data type in the given dataset. The actions can further include a modification to the syntax of a column name, such as a "snake casing" operation where compound words or phrases are written as a single string with separate elements separate by an underscore character. The actions may also include any other modification to the input dataset.

Figure 4:
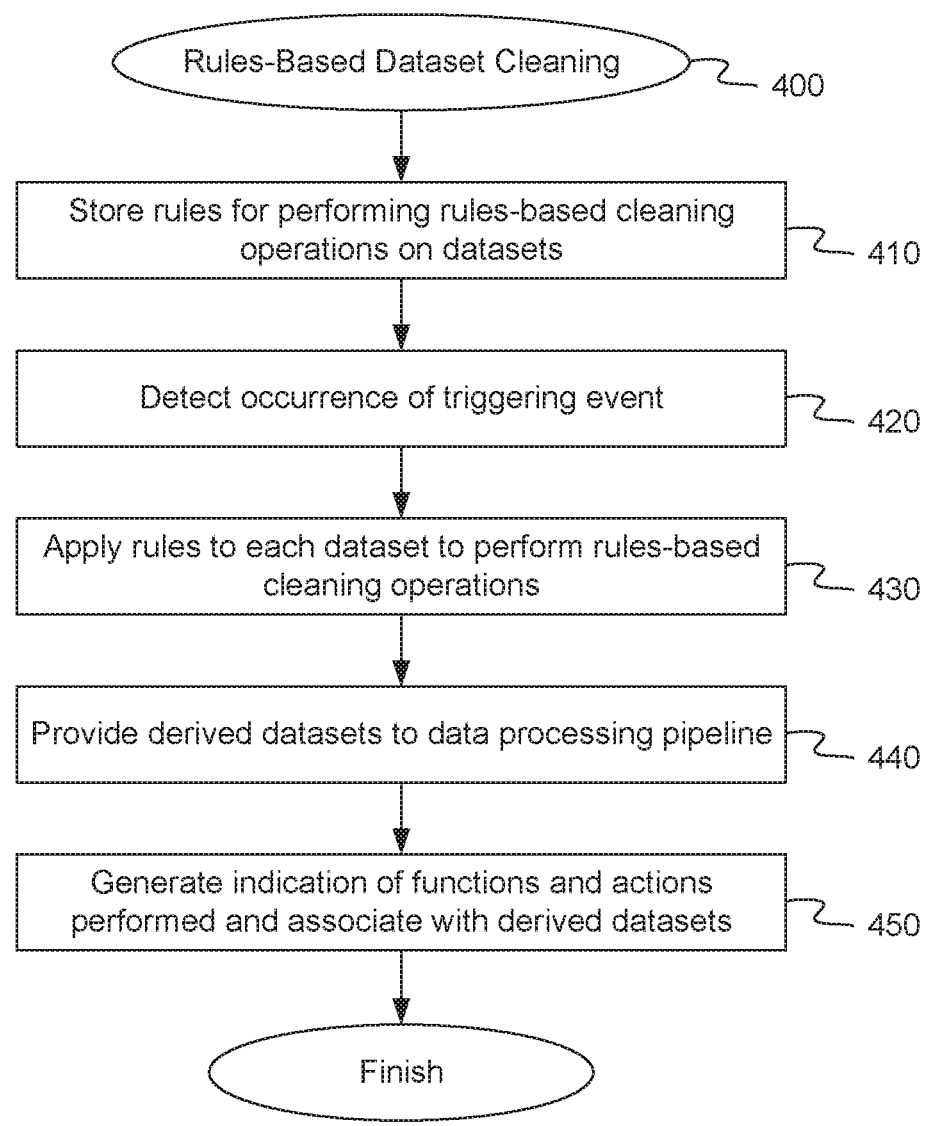
FIG. 4 is a flow diagram illustrating a method of rules-based dataset cleaning, according to an implementation.

FIG. 4 is a flow diagram illustrating a method of rules-based dataset cleaning, according to an implementation. The method 400 may be performed by processing logic that comprises hardware (e.g., circuitry, dedicated logic, programmable logic, microcode, etc.), software (e.g., instructions run on a processor to perform hardware simulation), or a combination thereof. In one implementation, method 400 may be performed by rules-based dataset cleaning system 110, as shown in FIGS. 1 and 3.

Referring to FIG. 4, at block 410, method 400 stores rules for performing rules-based cleaning operations on a plurality of datasets. Each rule comprises one or more functions (e.g., Function 1 250, Function y 260) to be executed against a dataset during the rules-based cleaning operations, the one or more functions each having one or more associated conditions (e.g., Condition 1 252, Condition x 254, Condition 1 262, Condition z 264) and actions (e.g., Action 1 256, Action x 258, Action 1 266, Action z 268), wherein the one or more actions are performed on the dataset responsive to the one or more associated conditions being satisfied.

At block 420, method 400 detects the occurrence of a triggering event. Depending on the embodiment, the triggering event can include at least one of a periodic interval having elapsed since a previous rules-based cleaning operation was performed, an addition of a new dataset to the plurality of datasets, or receipt of a request to perform a rules-based cleaning operation. In one embodiment, the rules are applied to each of the plurality of datasets automatically responsive to the triggering event.

At block 430, method 400 applies the rules to each of the plurality of datasets to perform the rules-based cleaning operations. Additional details regarding performance of the rules-based cleaning operations are provided below with respect to the description of FIG. 5.

At block 440, method 400 provides a derived dataset generated as a result of the rules-based cleaning operations to a data processing pipeline, such as from pipeline repository 107. The derived dataset can include at least one modification to the input dataset resulting from performing one or more actions associated with a respective function defined by the rules. Depending on the embodiment, the modification can include a modification to at least one column name or at least one column data type of the input dataset.

At block 450, method 400 generates an indication of functions for which the one or more associated conditions were satisfied and associated one or more actions were performed as a part of the rules-based cleaning operations and associates the indication with the derived dataset. In one embodiment, cleaner 230 stores this indication as metadata associated with the derived dataset in repository 210. In another embodiment, the indication is stored in some separate metadata store in datastore 105 or elsewhere. This indication can be useful to certain users who may wish to view the provenance of the derived dataset, to determine how the derived dataset was generated or what modifications where made to the input dataset as part of the rules-based dataset cleaning operation.

Figure 5:
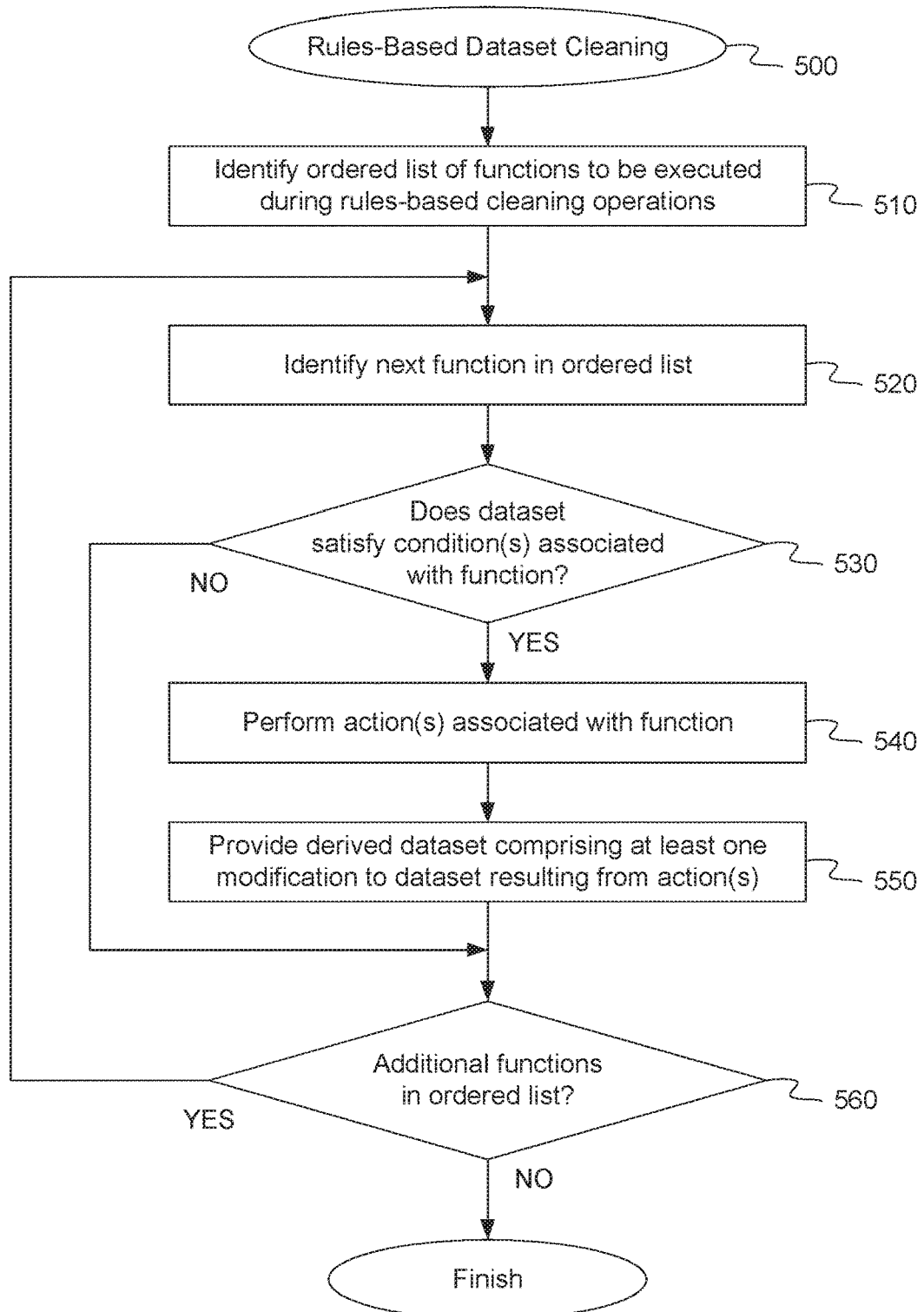
FIG. 5 is a flow diagram illustrating a method of rules-based dataset cleaning system, according to an implementation.

FIG. 5 is a flow diagram illustrating a method of rules-based dataset cleaning, according to an implementation. The method 500 may be performed by processing logic that comprises hardware (e.g., circuitry, dedicated logic, programmable logic, microcode, etc.), software (e.g., instructions run on a processor to perform hardware simulation), or a combination thereof. In one implementation, method 500 may be performed by rules-based dataset cleaning system 110, as shown in FIGS. 1 and 2.

Referring to FIG. 5, at block 510, method 500 identifies an ordered list of sequencer 240 of one or more functions to be executed with respect to the given dataset during the rules-based cleaning operations. In order to make the rules-based dataset cleaning operations consistent and repeatable, the ordered list of sequencer 240 indicates a number of functions (e.g., Function 1 250, Function Y 260) to be executed during a cleaning operation and a specific order in which those functions can be executed. Since some subsequent functions operate on the result of a previous function, the ordered list of sequencer 240 maintains the order in which the functions are executed so that the end result is consistent for multiple runs of the rules-based dataset cleaning operation.

At block 520, method 500 identifies a next function in the ordered list of sequencer 240. If the rules-based dataset cleaning operation has just been initiated, the next function may be the first function (e.g., Function 1 250) in the ordered list of sequencer 240. If the rules-based dataset cleaning operation was initiated earlier and some cleaning operations have already been performed, the next function may be some other function (e.g., Function y 260) in the ordered list of sequencer 240.

At block 530, method 500 determines whether a given dataset satisfies one or more conditions associated with a respective function of the one or more functions. In one embodiment, condition module 334 evaluates one or more conditions (e.g., Condition 1 252, Condition x 254) pertaining to a context of the dataset to return a result indicating whether or not to perform one or more actions (e.g., Action 1 256, Action x 258). To determine whether the given dataset satisfies the one or more conditions, condition module 334 can determine whether at least one of a name, identifier, path, or storage location associated with the given dataset matches a defined parameter. For example, condition module 334 can determine whether a name of the dataset being cleaned matches a regex defined by Condition 1 252.

Responsive to the given dataset satisfying the one or more conditions associated with the respective function, at block 540, method 500 performs, on the given dataset, one or more actions associated with the respective function. For example, if the name of the dataset does match the defined parameter (i.e., if Condition 1 252 is satisfied), action module 336 may perform Action 1 256 (e.g., change any column in the input dataset named "employee name" to "user name"). In another embodiment, action module 336 may perform Action x 254 (e.g., change a column in the input dataset having the column data type of long to a timestamp).

At block 550, method 500 provides a derived dataset comprising at least one modification to the given dataset resulting from the one or more actions associated with the respective function. Depending on the embodiment, the derived dataset can include a modification to at least one column name or column data type, or some other modification to the input dataset.

At block 560, method 500 determines whether there are additional functions to be executed in the ordered list of sequencer 240. If there are additional functions to be executed, method 500 returns to block 520, identifies the next function in the ordered list of sequencer 240, and performs the operations associated with blocks 520-550 for that next function.

Figure 6:
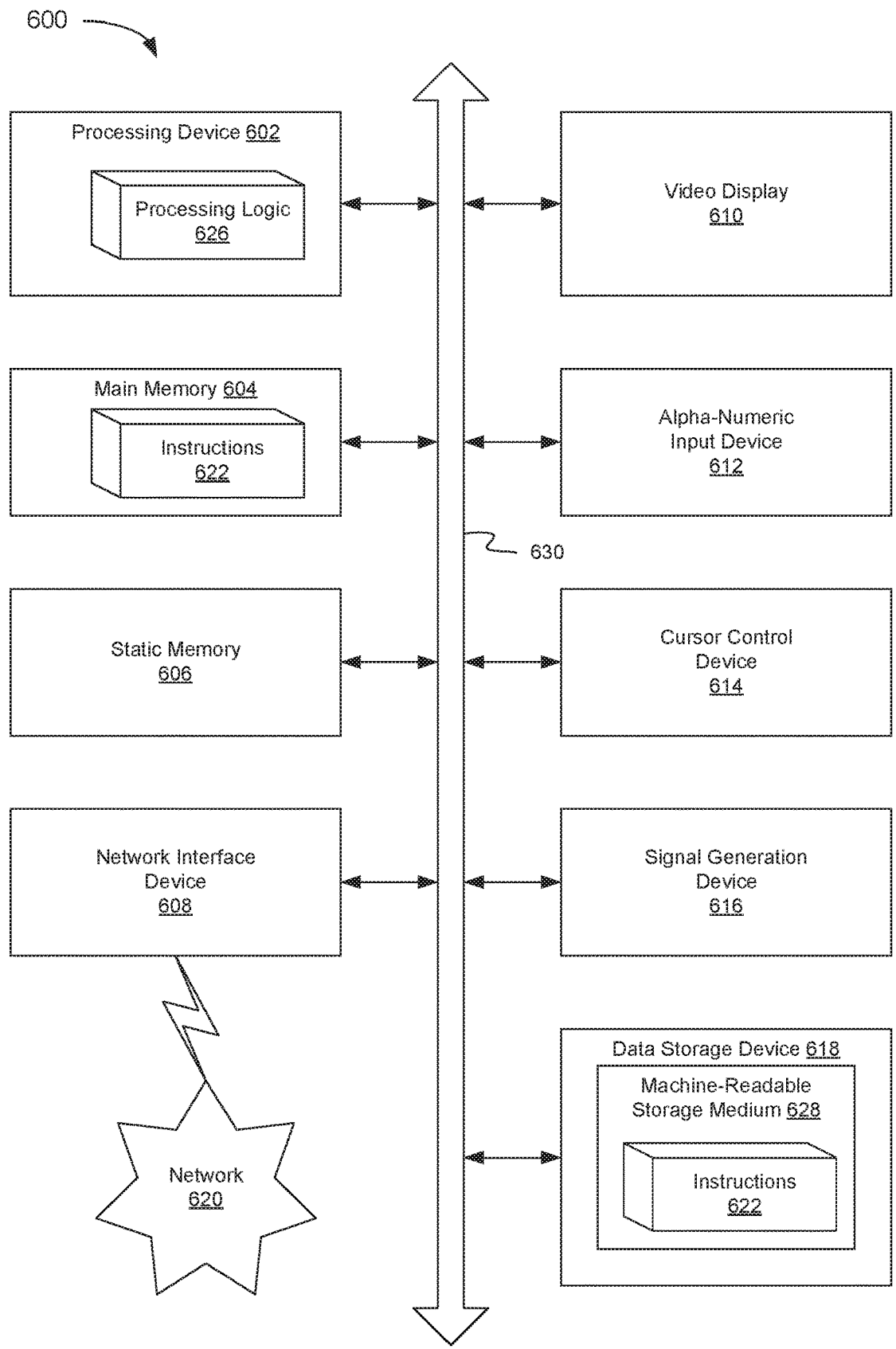
FIG. 6 is a block diagram illustrating a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a computing device, such as a server of data management platform 102 running rules-based dataset cleaning system 110 or a client computing system 130.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions 622 of rules-based dataset cleaning, as described herein. While the machine-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   storing rules for performing rules-based cleaning operations on a plurality of datasets, wherein each rule comprises a plurality of functions to be executed against a dataset during the rules-based cleaning operations, the plurality of functions each having one or more associated conditions and actions, wherein the one or more actions are performed on the dataset responsive to the one or more associated conditions being satisfied; and
   applying the rules to each of the plurality of datasets to perform the rules-based cleaning operations, wherein applying the rules to a given dataset comprises:
      identifying an ordered list of the plurality of functions to be executed with respect to the given dataset during the rules-based cleaning operations, the ordered list comprising a specific order in which the plurality of functions are to be executed, wherein the specific order is consistent for multiple occurrences of performing the rules-based cleaning operations;
      determining, for each of the plurality of functions, whether the given dataset satisfies one or more conditions pertaining to a context of the given dataset and associated with a respective function of the plurality of functions, wherein determining whether the given dataset satisfies the one or more conditions pertaining to the context of the given dataset and associated with the respective function comprises determining whether the context matches a defined parameter;
      responsive to the given dataset satisfying the one or more conditions pertaining to the context of the given dataset and associated with the respective function, performing, on the given dataset, one or more actions associated with the respective function to make at least one modification to the given dataset; and
      providing a derived dataset comprising the at least one modification to the given dataset resulting from the one or more actions associated with the respective function.

2. The method of claim 1, wherein each of the plurality of datasets comprises one or more columns each having corresponding column metadata, and wherein performing the one or more actions comprises modifying at least one column metadata of at least one of the one or more columns from the dataset.

3. The method of claim 2, wherein each column metadata comprises at least one of a column name or a column data type, and wherein performing the one or more actions comprises modifying at least one of a column name or a column data type of at least one of the one or more columns from the first dataset.

4. The method of claim 1, wherein the context of the given dataset comprises at least one of a name, identifier, path, or storage location associated with the given dataset.

5. The method of claim 1, wherein the rules are applied to each of the plurality of datasets automatically responsive to a triggering event, the triggering event comprising at least one of a periodic interval having elapsed since a previous rules-based cleaning operation was performed, an addition of a new dataset to the plurality of datasets, or receipt of a request to perform a rules-based cleaning operation.

6. The method of claim 1, wherein applying the rules to a given dataset further comprises:
   determining whether the derived dataset satisfies one or more conditions associated with a subsequent function in the ordered list of the plurality of functions; and
   responsive to the derived dataset satisfying the one or more conditions associated with the subsequent function, performing, on the derived dataset, one or more actions associated with the subsequent function.

7. The method of claim 1, further comprising:
generating an indication of the functions for which the one or more associated conditions were satisfied and the associated one or more actions were performed; and
associating the indication with the derived dataset.

8. The method of claim 1, wherein the rules are stored as an object model, the object model comprising one or more objects that each represent an action of the one or more actions to be performed with respect to the plurality of datasets, one or more objects that each represent a function of the plurality of functions that invokes the one or more actions, and one or more objects that each represent a condition of the one or more conditions defining whether to perform the one or more actions.

9. The method of claim 8, wherein the object model further comprises one or more objects that each represent a sequencer defining the ordered list of the plurality of functions to be executed, and an object representing a cleaner that orchestrates the rules-based cleaning operations.

10. A system comprising:
memory; and
one or more processors coupled to the memory, the one or more processors to:
store rules for performing rules-based cleaning operations on a plurality of datasets, wherein each rule comprises a plurality of functions to be executed against a dataset during the rules-based cleaning operations, the plurality of functions each having one or more associated conditions and actions, wherein the one or more actions are performed on the dataset responsive to the one or more associated conditions being satisfied; and
apply the rules to each of the plurality of datasets to perform the rules-based cleaning operations, wherein to apply the rules to a given dataset, the one or more processors to:
identify an ordered list of the plurality of functions to be executed with respect to the given dataset during the rules-based cleaning operations, the ordered list comprising a specific order in which the plurality of functions are to be executed, wherein the specific order is consistent for multiple occurrences of performing the rules-based cleaning operations;
determine, for each of the plurality of functions, whether the given dataset satisfies one or more conditions pertaining to a context of the given dataset and associated with a respective function of the plurality of functions, wherein to determine whether the given dataset satisfies the one or more conditions pertaining to the context of the given dataset and associated with the respective function, the one or more processors to determine whether the context matches a defined parameter;
responsive to the given dataset satisfying the one or more conditions pertaining to a context of the given dataset and associated with the respective function, perform, on the given dataset, one or more actions associated with the respective function to make at least one modification to the given dataset; and
provide a derived dataset comprising the at least one modification to the given dataset resulting from the one or more actions associated with the respective function.

11. The system of claim 10, wherein each of the plurality of datasets comprises one or more columns each having corresponding column metadata, wherein to perform the one or more actions, the one or more processors to modify at least one column metadata of at least one of the one or more columns from the dataset.

12. The system of claim 11, wherein each column metadata comprises at least one of a column name or a column data type, and wherein to perform the one or more actions, the one or more processors to modify at least one of the column name or the column data type of at least one of the one or more columns from the first dataset.

13. The system of claim 10, wherein the context of the given dataset comprises at least one of a name, identifier, path, or storage location associated with the given dataset.

14. The system of claim 10, wherein the rules are applied to each of the plurality of datasets automatically responsive to a triggering event, the triggering event comprising at least one of a periodic interval having elapsed since a previous rules-based cleaning operation was performed, an addition of a new dataset to the plurality of datasets, or receipt of a request to perform a rules-based cleaning operation.

15. The system of claim 10, wherein to apply the rules to a given dataset, the one or more processors further to:
determine whether the derived dataset satisfies one or more conditions associated with a subsequent function in the ordered list of the plurality of functions; and
responsive to the derived dataset satisfying the one or more conditions associated with the subsequent function, perform, on the derived dataset, one or more actions associated with the subsequent function.

16. A non-transitory computer readable storage medium storing instructions that, when executed by one or more processors, cause the one or more processors to:
store rules for performing rules-based cleaning operations on a plurality of datasets, wherein each rule comprises a plurality of functions to be executed against a dataset during the rules-based cleaning operations, the plurality of functions each having one or more associated conditions and actions, wherein the one or more actions are performed on the dataset responsive to the one or more associated conditions being satisfied; and
apply the rules to each of the plurality of datasets to perform the rules-based cleaning operations, wherein to apply the rules to a given dataset, the instructions cause the one or more processors to:
identify an ordered list of the plurality of functions to be executed with respect to the given dataset during the rules-based cleaning operations, the ordered list comprising a specific order in which the plurality of functions are to be executed, wherein the specific order is consistent for multiple occurrences of performing the rules-based cleaning operations;
determine, for each of the plurality of functions, whether the given dataset satisfies one or more conditions pertaining to a context of the given dataset and associated with a respective function of the plurality of functions, wherein the context of the given dataset comprises at least one of a name, identifier, path, or storage location of the given dataset, and wherein to determine whether the given dataset satisfies the one or more conditions pertaining to the context of the given dataset and associated with the respective function, the instructions cause the one or more processors to determine whether the context matches a defined parameter;
responsive to the given dataset satisfying the one or more conditions pertaining to a context of the given dataset and associated with the respective function, perform, on the given dataset, one or more actions associated with the respective function to make at least one modification to the given dataset; and provide a derived dataset comprising the at least one modification to the given dataset resulting from the one or more actions associated with the respective function.

17. The non-transitory computer readable storage medium of claim 16, wherein each of the plurality of datasets comprises one or more columns each having corresponding column metadata, wherein to perform the one or more actions, the instructions cause the one or more processors to modify at least one column metadata of at least one of the one or more columns from the dataset.

18. The non-transitory computer readable storage medium of claim 17, wherein each column metadata comprises at least one of a column name or a column data type, and wherein to perform the one or more actions, the instructions cause the one or more processors to modify at least one of the column name or the column data type of at least one of the one or more columns from the first dataset.

19. The non-transitory computer readable storage medium of claim 16, wherein the context of the given dataset comprises at least one of a name, identifier, path, or storage location associated with the given dataset.

20. The non-transitory computer readable storage medium of claim 16, wherein the rules are applied to each of the plurality of datasets automatically responsive to a triggering event, the triggering event comprising at least one of a periodic interval having elapsed since a previous rules-based cleaning operation was performed, an addition of a new dataset to the plurality of datasets, or receipt of a request to perform a rules-based cleaning operation.

* * * * *